US010298493B2

United States Patent
Liljenstolpe et al.

(10) Patent No.: US 10,298,493 B2
(45) Date of Patent: May 21, 2019

(54) PROCESSING ROUTE DATA

(71) Applicant: Metaswitch Networks Ltd, Enfield, Middlesex (GB)

(72) Inventors: Christopher David Liljenstolpe, San Francisco, CA (US); Jonathan Eric Hardwick, Chesterfield (GB); Jonathan Richard Berger, Enfield (GB)

(73) Assignee: Metaswitch Networks Ltd, Enfield (GB)

( * ) Notice: Subject to any disclaimer, the term of this patent is extended or adjusted under 35 U.S.C. 154(b) by 0 days.

(21) Appl. No.: 14/610,965

(22) Filed: Jan. 30, 2015

(65) Prior Publication Data
US 2016/0226760 A1    Aug. 4, 2016

(51) Int. Cl.
| H04L 12/46 | (2006.01) |
| H04L 12/741 | (2013.01) |
| H04L 12/715 | (2013.01) |
| H04L 12/717 | (2013.01) |
| H04L 29/06 | (2006.01) |

(52) U.S. Cl.
CPC ............ H04L 45/74 (2013.01); H04L 45/04 (2013.01); H04L 45/42 (2013.01); H04L 69/22 (2013.01); H04L 63/062 (2013.01); H04L 63/0823 (2013.01)

(58) Field of Classification Search
None
See application file for complete search history.

(56) References Cited

U.S. PATENT DOCUMENTS

| 6,728,779 | B1 * | 4/2004 | Griffin | H04L 45/02 370/469 |
| 8,937,961 | B1 | 1/2015 | Vairavakkalai | |
| 9,106,530 | B1 * | 8/2015 | Wang | H04L 41/12 |
| 2002/0165957 | A1 | 11/2002 | Devoe | |
| 2007/0091795 | A1 * | 4/2007 | Bonaventure | H04L 45/04 370/228 |

(Continued)

OTHER PUBLICATIONS

Walton et al., Advertisement of Multiple Paths in BGP, draft-walton-add-paths-06.txt, Jan. 2009.*

(Continued)

*Primary Examiner* — Asad M Nawaz
*Assistant Examiner* — Zhaohui Yang
(74) *Attorney, Agent, or Firm* — EIP US LLP

(57) ABSTRACT

Measures, including methods, systems and computer program products, for use in processing route data in a network comprising a plurality of autonomous systems. At a network device, route data defining at least one route for network traffic which is configured on at least one border network device is received from the at least one border network device. The at least one border network device is located at a border of an autonomous system in the plurality of autonomous systems. The network device processes the received route data according to a set of policies to generate modified route data. The network device transmits at least a part of the modified route data to the at least one border network device. The at least part of the modified route data is operable to instruct the at least one border network device to modify the behavior of the at least one route.

19 Claims, 5 Drawing Sheets

(56) References Cited

U.S. PATENT DOCUMENTS

| | | | |
|---|---|---|---|
| 2007/0097974 A1 | 5/2007 | Ward et al. | |
| 2007/0104197 A1* | 5/2007 | King | H04L 63/0263 |
| | | | 370/392 |
| 2007/0153763 A1 | 7/2007 | Rampolla | |
| 2008/0013551 A1 | 1/2008 | Scholl | |
| 2010/0080131 A1 | 4/2010 | Ward | |
| 2010/0142543 A1* | 6/2010 | Shaikh | H04L 45/04 |
| | | | 370/401 |
| 2012/0144066 A1* | 6/2012 | Medved | H04L 45/02 |
| | | | 709/242 |
| 2012/0224506 A1* | 9/2012 | Gredler | H04L 45/04 |
| | | | 370/254 |
| 2013/0125235 A1 | 5/2013 | Vaidyanthan | |
| 2014/0129735 A1 | 5/2014 | Thyni et al. | |
| 2016/0142310 A1* | 5/2016 | Means | H04L 63/0272 |
| | | | 370/392 |

OTHER PUBLICATIONS

Scudder et al., BGP Monitoring Protocol, draft-ietf-grow-bmp-07, Network Working Group, Oct. 22, 2012.*

Bush Internet Initiative Japan R: "Origin validation operation based on the resource public key infrastructure (RPKI); rfc7115.txt",Internet Engineering Task Force, IETF; Standard, Internet Society (ISOC) 4, Rue Des Falaises CH—1205 Geneva, Switzerland, Jan. 15, 2014.

Extended European Search Report dated Jul. 1, 2016 issued on related application EP 16153325.2, filed Jan. 29, 2016.

European Examination report dated Dec. 3, 2018 on related Application No. EP 16153325.2, filed Jan. 29, 2016.

* cited by examiner

PROCESSING ROUTE DATA

BACKGROUND OF THE INVENTION

Field of the Invention

The present disclosure relates to processing route data. In particular, but not exclusively, the present disclosure relates to processing route data in a network comprising a plurality of autonomous systems.

Description of the Related Technology

In a communications network, network devices are arranged and configured to control how information is transmitted across the network. For example, in a packet-switched network, network devices such as routers, bridges, gateways, firewalls and switches may be deployed and configured to selectively forward packets across the network. A network device may perform a routing function using a routing definition such as a routing table that lists a number of routes or paths through the network in order to deliver a packet to a defined destination. These network devices may also be arranged to perform a number of data plane routing functions that are managed by a control and/or management plane, such as filtering packets, discarding packets, or providing certain packets with preferential routing. A typical network device comprises an embedded computing device with a microcontroller arranged and configured to load computer program code in the form of firmware from a read-only or flash memory.

Large scale networks, such as the Internet, use a variety of routing protocols to determine how network traffic is to be routed through a large number of heterogeneous networks. These networks initially used static routing definitions. However, these quickly became impractical given the number of interconnected networks and the organic growth of connections. Hence, routing protocols such as Border Gateway Protocol (BGP) were developed. BGP is the protocol used on the Internet to achieve routing between different autonomous systems. A BGP attribute is a property of a BGP route that provides information about the path that the route follows and/or other data about the route. A BGP route includes a set of destination addresses together with a set of BGP attributes which describe the path to those addresses. An external BGP (eBGP) session involves a connection between two BGP routers which reside in different autonomous systems, whereas an internal BGP (iBGP) session involves a connection between two BGP routers which reside in the same autonomous system.

Routing protocols allow particular networks or routing domains, which are referred to in BGP as autonomous systems, to exchange routing information so as to agree upon a suitable path for routing network traffic. An autonomous system (AS) is a network with a consistent set of routing policies that is under the management of a single administrative entity. Each autonomous system has an associated AS number that is used to globally identify that autonomous system. An AS path attribute can be defined as an ordered list of the AS numbers of autonomous systems that packets following this route would traverse.

Typically, network devices within each autonomous system exchange network route definitions, for example proposed routes, and a routing policy is implemented by a given network device to determine which route definitions are to be added to the network device's working routing definition or table. For example, a router may receive several different proposed routes for routing network traffic, such as data packets, to a given destination. The router would thus implement a forwarding decision based, in part, on a set of one or more routing policies to determine which of the several different proposed routes to use. A routing policy may be applied to one or more route attributes that are defined as part of the received network route definitions. For example, one attribute is AS_PATH, i.e. a definition of the path through one or more autonomous systems that is associated with the route. If a proposed route passes through autonomous systems 1, 3 and 5 then the AS_PATH may be defined as {1, 3, 5}. Certain routing policies select a proposed route based on the AS_PATH length. In the aforementioned example the path length is 3, and this network route definition may be selected over a proposed route with a path length of 5.

Internet Service Providers (ISPs) typically use BGP policy both as a network security mechanism, and a way to embody business logic in the network. As the Internet architecture, the services running over it and the business models that support it have become more complex, the BGP policy infrastructure has grown proportionally more complex as well. This complexity causes substantial problems in the network operations community and has been a topic of discussion at recent North American Network Operators' Group (NANOG) meetings and operations groups within the Internet Engineering Task Force (IETF).

The complexity of BGP policies has multiple adverse impacts on operators, and ultimately, on users of the Internet. Some operators have routers with over 500,000 BGP policy statements in their configuration. The expectation is that the size of the policies will continue to grow. The sheer size of this policy can lead to it taking upwards of one hour to boot a router from a cold start, and more than five minutes to commit a single line change to the configuration.

The size and complexity of the configuration can lead directly to mistakes of human error, which usually have very disruptive consequences. For example, the exploit of YouTube™ several years ago was directly related to this complexity. There had been a failure when trying to implement a business-driven BGP policy, which led to propagation of an invalid route for YouTube™ to large sections of the global Internet. Furthermore, the complexity of the BGP policy space meant that many operators had not deployed defensive policies which might have been able to stop the spread of the invalid routes.

At the same time, the IETF Routing Area is trying to deploy a technology called BGPSEC that will provide more surety in route announcements by using a Public Key Infrastructure (PKI) and cryptographic signatures in real time within these already overburdened routers to validate route announcements are they are received. There is a growing level of skepticism in the operational community as to whether this approach will be effective, or even deployable.

SUMMARY

According to embodiments, there is a method for use in processing route data in a network comprising a plurality of autonomous systems, the method comprising:

at a network device, receiving, from at least one border network device in the network, route data defining at least one route for network traffic which is configured on the at least one border network device, wherein the at least one border network device is located at a border of an autonomous system in the plurality of autonomous systems;

at the network device, processing the received route data according to a set of policies to generate modified route data; and at the network device, transmitting, to the at least one border network device, at least a part of the modified route data, wherein the at least part of the modified route data is operable to instruct the at least one border network device to modify the behavior of the at least one route.

According to embodiments, there is a system (or 'apparatus') for use in processing route data in a network comprising a plurality of autonomous systems, the system comprising at least one memory including computer program code; and at least one processor in data communication with the at least one memory, wherein the at least one processor is configured to:

at a network device, receive, from at least one border network device in the network, route data defining at least one route for network traffic which is configured on the at least one border network device, wherein the at least one border network device is located at a border of an autonomous system in the plurality of autonomous systems;

at the network device, process the received route data according to a set of policies to generate modified route data; and at the network device, transmit, to the at least one border network device, at least a part of the modified route data, wherein the at least part of the modified route data is operable to instruct the at least one border network device to modify the behavior of the at least one route.

According to embodiments, there is a non-transitory computer-readable storage medium comprising computer-executable instructions which, when executed by a processor, cause a computing device to perform a method for use in processing route data in a network comprising a plurality of autonomous systems, the method comprising:

at a network device, receiving, from at least one border network device in the network, route data defining at least one route for network traffic which is configured on the at least one border network device, wherein the at least one border network device is located at a border of an autonomous system in the plurality of autonomous systems;

at the network device, processing the received route data according to a set of policies to generate modified route data; and at the network device, transmitting, to the at least one border network device, at least a part of the modified route data, wherein the at least part of the modified route data is operable to instruct the at least one border network device to modify the behavior of the at least one route.

According to embodiments, there is a method for use in processing route data in a network comprising a plurality of autonomous systems, the method comprising:

at a border network device in the network, transmitting, to a network device, route data defining at least one route for network traffic which is configured on the border network device, wherein the border network device is located at a border of an autonomous system in the plurality of autonomous systems;

at the border network device, receiving, from the network device, modified route data, the modified route data having been generated at the network device by processing the route data transmitted from the border network device according to a set of policies; and at the border network device, in response to receipt of the modified route data, modifying the behavior of the at least one route. Embodiments may also comprise a system and/or computer program product to implement this method.

Further features of embodiments of the present disclosure will become apparent from the following description of preferred embodiments, given by way of example only, which is made with reference to the accompanying drawings.

DETAILED DESCRIPTION OF CERTAIN INVENTIVE EMBODIMENTS

Figure 1:
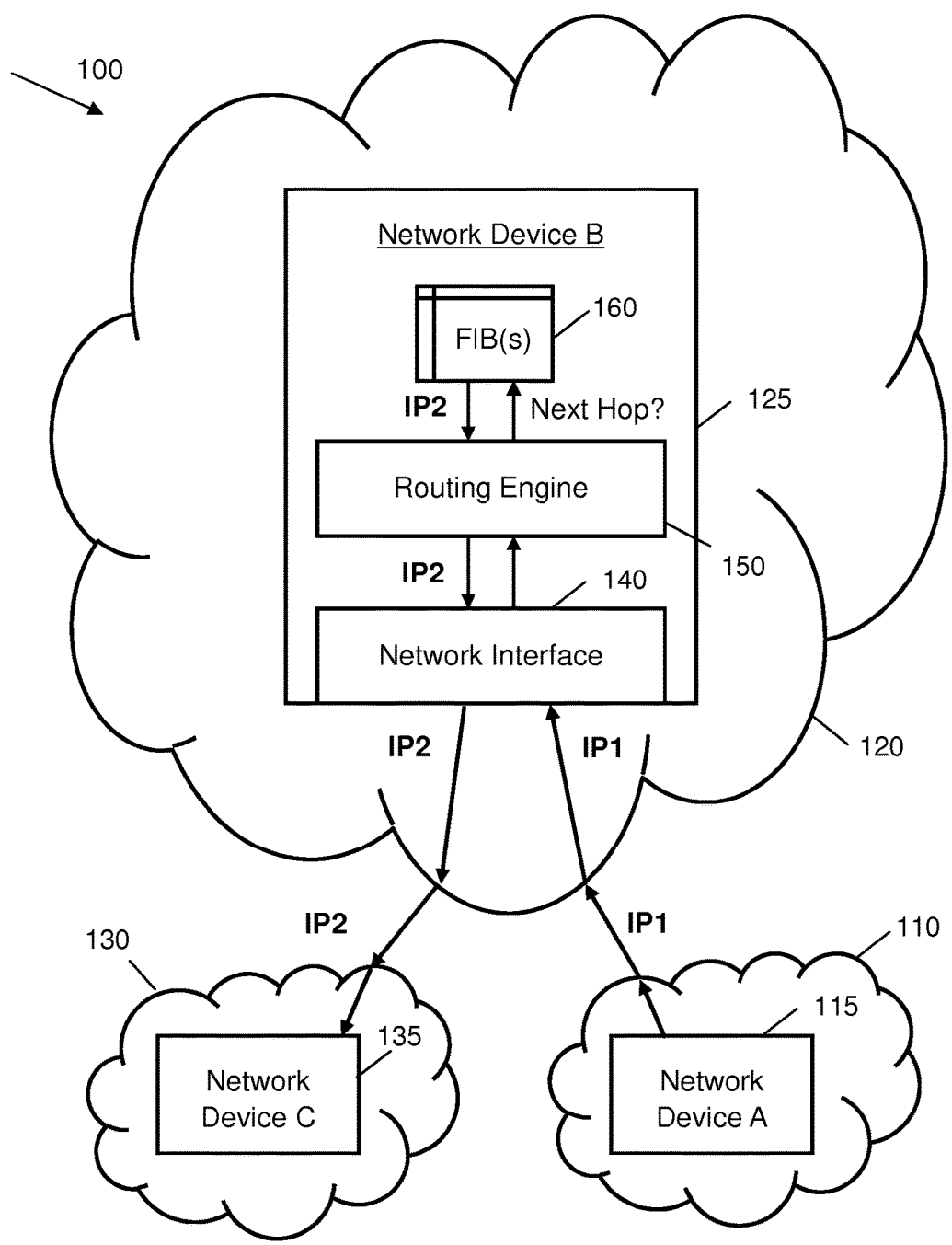
FIG. 1 shows a network according to an example.

FIG. 1 shows a network device using a set of forwarding information bases according to an example network 100. FIG. 1 shows three autonomous systems 110, 120 and 130. Each autonomous system comprises a network or group of networks, for example a routing domain that is under common control and that has agreed upon routing policies. The autonomous systems of FIG. 1 are communicatively coupled, for example by one or more physical network connections. In FIG. 1, an example network device is shown as being present in each autonomous system: autonomous system 110 comprises network device A 115; autonomous system 120 comprises network device B 125; and autonomous system 130 comprises network device C 135. The example network 100 of FIG. 1 may be seen as a simplistic representation of a portion of the Internet.

Although only one network device is shown in each autonomous system in network 100, each autonomous system may comprise a plurality of network devices. Network devices may comprise, amongst others, routers, bridges, gateways, firewalls and switches. These devices may be hardware devices, such as an embedded computer device, and/or virtualized devices. Any physical layer coupling may be used to communicatively couple each network device to one or more networks, for example any wired and/or wireless connections. Each network device 115, 125, 135 shown in FIG. 1 is arranged and configured to route network traffic. For example, each network device may be arranged and configured to selectively forward packets in a packet-switched network and/or filter packets (for example selectively discard packets). Routing may be performed for Internet Protocol (IP) packets, for example for one or more of version 4 (IPv4) and version 6 (IPv6).

FIG. 1 also shows an example of information being routed between the autonomous systems 110, 120 and 130. In this example, network device A 115 sends a data packet with a destination IP address of IP1. This is the IP address of network device B 125. Network device B 125 is shown comprising a network interface 140, a routing engine 150 and a set of forwarding information bases 160. The data packet is received at a network interface 140. The network interface 140 may comprise a physical network interface and/or control logic to perform one or more of physical, data link and network processing. Details of the received packet are passed to the routing engine 150. The routing engine 150 determines a destination address of the packet and queries the set of forwarding information bases 160 for an IP address of a next hop on a path to the destination address. For example, the set of forwarding information bases 160 may comprise a table with a column of destination network addresses or prefixes and corresponding next network device IP addresses. As such, the set of forwarding information bases 160 comprises one or more routes that are used by the network device to route network traffic. The routing engine 150 may look up the row containing the destination address or prefix that corresponds to the packet destination address and retrieve the IP address of the corresponding next network device. In the example of FIG. 1, the corresponding next network device is network device C 135, which has IP address IP2. The routing engine 150 thus retrieves the address "IP2" from the set of forwarding information bases 160, inserts this address into the packet details and forwards the packet to network device C 135 via the network interface 140.

As described previously, network devices may use one or more routing protocols to co-ordinate and control the routing of information across the one or more autonomous systems. Interior gateway protocols may be used within each autonomous system and exterior gateway protocols may be used for communications between autonomous systems. For example, each network device may implement one or more routing protocols such as BGP, the Open Shortest Path First (OSPF) protocol, the Resource Reservation Protocol (RSVP), the Label Distribution Protocol (LDP) and/or the Intermediate System to Intermediate System (IS-IS) protocol. One or more routing protocols are used by each network device to communicate with other network devices so as to configure routing between nodes of various autonomous systems. For example, the network device 110 may have knowledge of at least a portion of one or more networks it is directly coupled to and may use one or more routing protocols to acquire further knowledge of a wider network and/or additional devices on or one or more further networks. In the example of FIG. 1, an exterior gateway protocol such as BGP enables network devices to exchange information across autonomous systems, whereas each autonomous system may use an interior gateway protocol to control routing within its respective network or networks.

Figure 2:
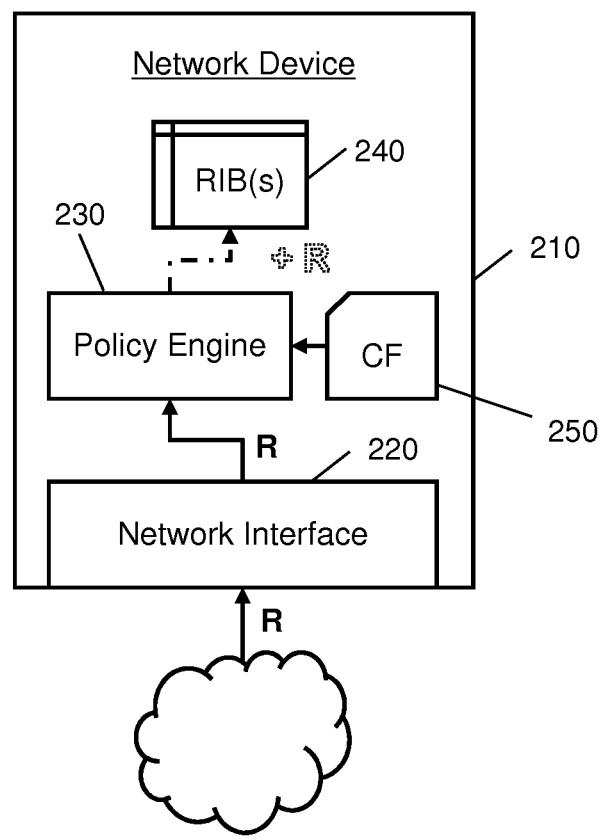
FIG. 2 shows a network device according to an example.

FIG. 2 shows an example of a network device 210 implementing BGP to configure a routing definition. The network device 210 may for example be any one of the network devices 115, 125, 135 of FIG. 1.

The network device 210 of FIG. 2 comprises a network interface 220, a policy engine 230 and a set of routing information bases 240. The network interface 220 may comprise a network interface such as network interface 140, for example the same interface that is used to receive packets over one or more network couplings, or an independent network interface, for example a dedicated side channel for the exchange of control information. The policy engine 230 is arranged to process a routing configuration file 250 in order to implement a BGP routing policy. The BGP routing policy is defined by way of electronic data from the routing configuration file 250.

The BGP routing policy defined in routing configuration file 250 enables packets to be selectively communicated over a number of different paths depending on a number of configurable criteria. For example, in addition to (or instead of) a default network traffic path (for example based on a packet's destination address), it may be desired to selectively route packets based on, amongst others, one or more of: path bandwidth, path switching, traffic loading, packet priority, packet source and packet destination. Further, use of the BGP routing policy allows for a network operator to control which routes are installed and/or preferred in a network. For example, this may be based on technical policy and/or network security policy.

In FIG. 2, the network device 210 is arranged to receive, via the network interface 220, a proposed route—"R"—for addition to the set of routing information bases 240. For example, this may be a route advertised by, for example sent out from, a network device in a neighboring autonomous system. It may also be a route advertised by a network device within the network or networks of the autonomous system of network device 210. The proposed route may be in the form of a network route definition. A network route definition for BGP for IP may comprise one or more of: an IP prefix for which the route applies (for example 10.11.0.0/16 indicates that this route applies to all IP addresses that match 10.11 in their first 16 bits—for example applies for the destination network 10.11); a next hop, which is the address of a network device (for example a router) to which packets for that prefix should be sent (this may be the same address as the router that is advertising the route); an autonomous system (AS) path, which is a sequence of autonomous system numbers indicating where the route was learned from; communities, a list of 32-bit labels which are agreed between the two parties exchanging routes (for example they may use label 1234 to indicate a high-bandwidth route or 5678 to indicate a route that should only be used on Thursdays); and various other metadata.

The policy engine 230 receives the proposed route from the network interface 220 and implements the routing policy defined in the routing configuration file 250 to control whether the proposed route is to be added to the set of routing information bases 240. For example, the policy engine 230 may implement the routing policy defined in the routing configuration file 250 to prioritize between routes that share prefixes, for example which are for a common destination. The policy engine 230 may process a network route definition associated with a proposed route to determine, amongst others, one or more of: origin AS for the route, intermediate AS path characteristics, length of the path, peer that the path was learned from, community strings set on the path, etc. If a proposed route is to be accepted by the network device 210 and added to the set of routing information bases 240, for example based on the routing policy defined in the routing configuration file, then the policy engine 230 may also determine whether any attributes of the accepted route are to be modified. For example, an accepted route may be modified to set a relative preference, delete or sanitize certain information associated with the route (for example removing private information) and/or tag the route with additional information. In FIG. 2, a dashed line between the policy engine 230 and the set of routing information bases 240 indicates that a received route may be selectively added to the set of routing information bases 240 based on processing performed by the policy engine 230.

Figure 3:
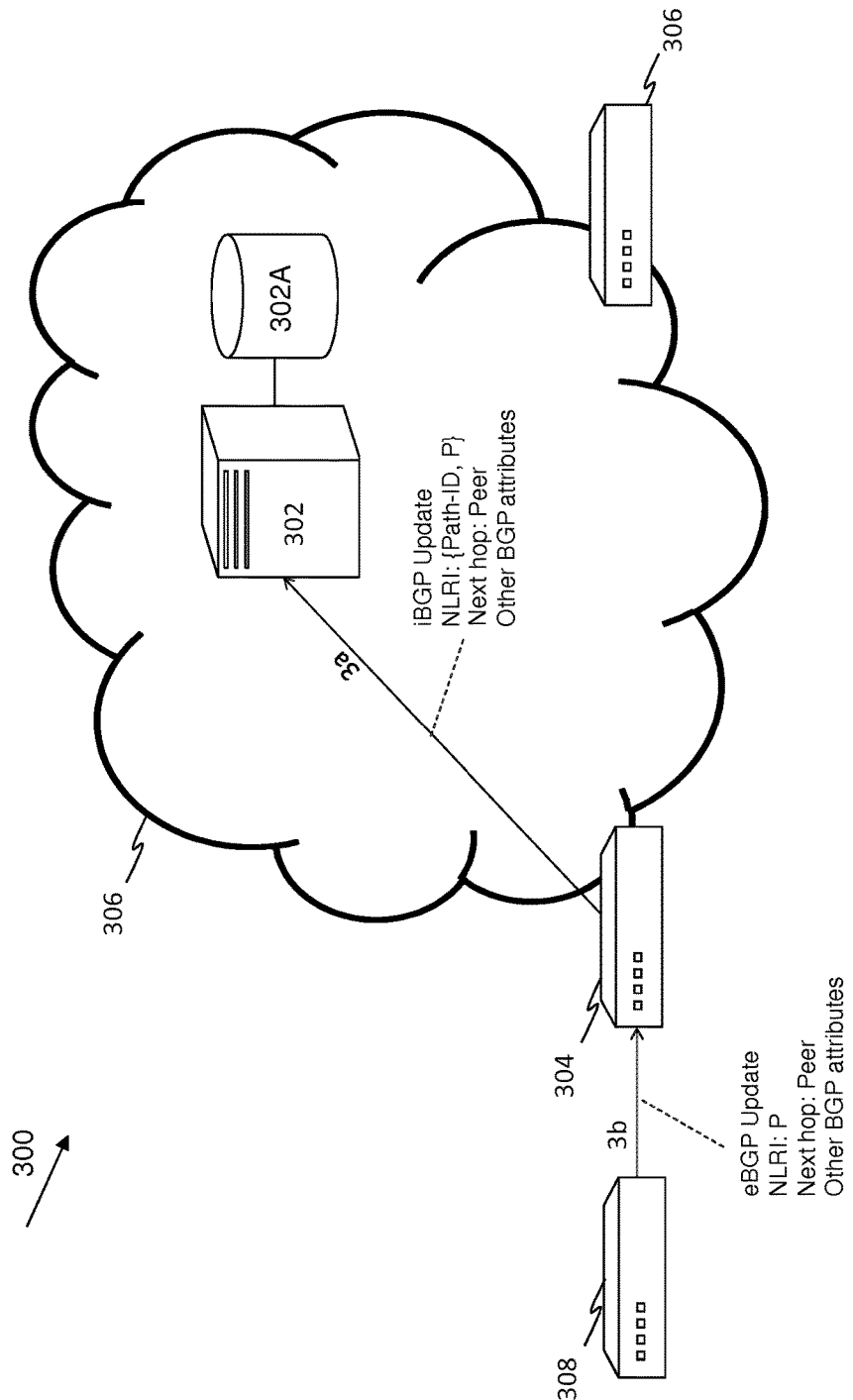
FIG. 3 shows a network according to embodiments.

FIG. 3 shows a network 300 according to embodiments. Network 300 comprises an AS 306. Network 300 may comprise other ASs (not shown). AS 306 comprises a network device 302 which is responsible for carrying out various data processing tasks according to embodiments. Network device 302 has access to a database 302A for storing data such as policy data; database 302A may be located local to or remotely from network device 302.

AS 306 also comprises a number of network devices, in this case including border network device 304 and border network device 306. Network 300 also comprises a peer network device 308 which is a peer of border network device 304. Peer network device 308 is located outside of AS 306, for example in another AS (not shown) of network 300. In embodiments, each of the border network devices 304, 306 in the plurality of border network devices supports one or more of BGP, OSPF, RSVP, LDP and/or other routing or path setup protocols.

A border network device (such as a border router) is a network device situated at the edge of an autonomous system, such that some of its network peers are network devices (such as routers) outside its own autonomous system. A border network device may also be referred to as an edge network device (such as an edge router) or a provider edge device (such as a provider edge router).

Embodiments comprise measures, including methods, systems (or 'apparatus') and computer program products, for use in processing route data in a network 300 comprising a plurality of autonomous systems. At a network device 302, route data defining at least one route for network traffic which is configured on an at least one border network device 304, is received 3a, from the at least one border network device 304 in the network. The at least one border network device 304 is located at a border of an autonomous system 306 in the plurality of autonomous systems. Network device 302 processes the received route data according to a set of policies to generate modified route data. The set of policies is stored in database 302A.

Figure 4:
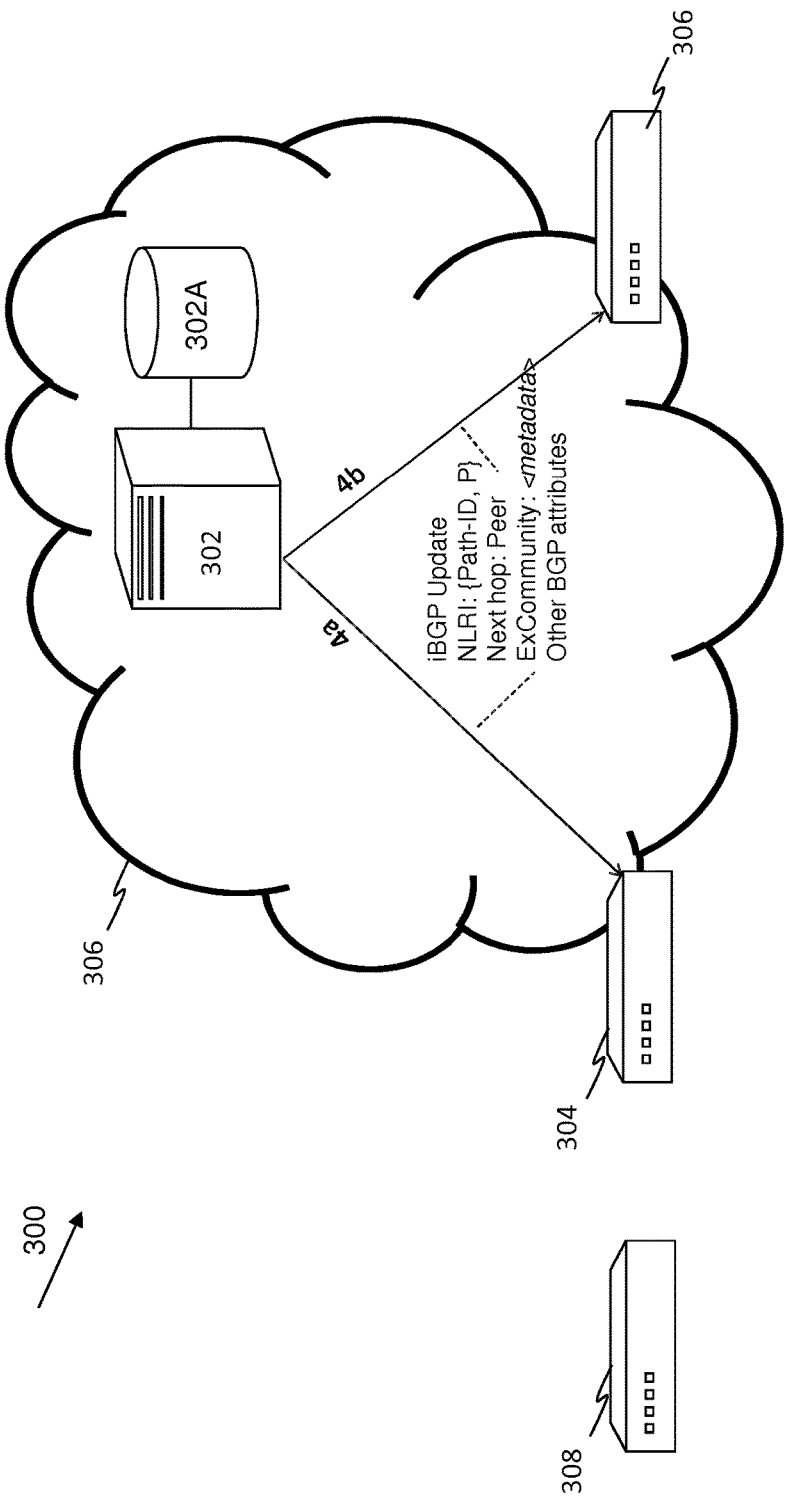
FIG. 4 shows a network according to embodiments.

As shown in FIG. 4, network device 302 then transmits 4a, to the at least one border network device 304, at least a part of the modified route data; in such embodiments, the at least part of the modified route data is operable to instruct the at least one border network device 304 to modify the behavior of the at least one route.

Embodiments comprise, at network device 302, transmitting 4b, to at least one other border network device 306, at least a part of the modified route data, wherein the at least part of the modified route data is operable to instruct the at least one other border network device 306 to modify the behavior of at least one route.

In embodiments, generating the modified route data comprises inserting metadata into the received route data, wherein the inserted metadata defines one or more modifications to the at least one route. In some embodiments, the metadata is inserted into an extended community field of the received route data, for example an extended community BGP attribute field. An extended community BGP attribute contains an arbitrary string and is used to mark BGP routes according to policies configured by the operator and/or automatically enforced by a BGP router.

In embodiments, the set of policies comprises at least one of one or more network operator-defined static policies, and one or more dynamic policies based at least in part on one or more of historical route data and externally sourced route data. In some such embodiments, the network device obtains at least a part of the one or more historical route data and externally sourced route data from an Internet Route Registry (IRR) database (not shown) located in the network. An IRR is a public database which allows networks to publish details about well-known, valid Internet routes. Entities such as ISPs may consult an IRR to construct policies in order to do route validity checking.

In some embodiments, the route data received from the at least one border network device 304 comprises route data received 3b by the at least one border network device 304 from one or more peer network devices 308.

Embodiments comprise measures, including methods, systems (or 'apparatus') and computer program products, for use in processing route data in a network 300 comprising a plurality of autonomous systems. At a border network device 304 in the network, route data defining at least one route for network traffic which is configured on border network device 304 is transmitted 3a to a network device 302. Border network device 304 is located at a border of autonomous system 306 in the plurality of autonomous systems. Modified route data, is received 4a from network device 302 at border network device 304; the modified route data was generated at network device 302 by processing the route data transmitted from border network device 304 according to a set of policies. In response to receipt of the modified route data, border network device 304 modifies the behavior of the at least one route.

Embodiments of the present disclosure relate to operation of a network device in the form of a policy server (for example a BGP policy server) which is a network device that applies sophisticated policies to routes, for example BGP routes, in a central server within an autonomous system (AS). By using a policy server according to embodiments, network operators can increase the type, size and complexity of their policies far beyond what is possible using border network devices (such as border routers) today. The policy server may for example comprise network device 302 described above in relation to FIGS. 3 and 4.

Embodiments comprise a centralized policy server which analyzes routes received from one or more peer ASs and assigns a piece of metadata to some or all of the routes to convey the result of the analysis. The enormous policies that are configured on a network's border device (such as border) routers can thus be replaced with a small number of simple policies that translate this metadata into an action to take with respect to the respective route. This frees the border network devices from the processing overhead of implementing a complex policy, and frees the network operator from the constraint of having to express their policy using the limited command line interface available on the border router. In some embodiments the routes comprise BGP routes.

The operating sequence of a policy server according to some embodiments is as follows:

Each of the network's border routers pass all routes (such as BGP routes) that they receive from their peers (for example their external peers) to the policy server.

In some embodiments, at the same time as a border router is passing all the external routes it knows to the policy server, it is also following a simple policy that defines how an "un-evaluated" route should be treated in the network (for example de-prioritized, left as-is, not exported, etc.). Such embodiments can be employed where the evaluation of the route by the policy server is asynchronous.

Once the policy server has all of the routes, it uses a set of policies (which may be a relatively simple, coarse set of policies) to decide which routes need further evaluation. Routes that need further evaluation are handed to a sophisticated policy engine, which may either apply static policies to the routes that are written by the operator, or may use some dynamic process to evaluate the routes which relies on historical data and/or external sources of information such as one or more IRRs.

After the policy server evaluates a route, it adds an extended community string (such as a BGP extended community string) to the route and sends the route back to the border router that supplied it. The extended community carries metadata which supplies the result of the policy server's evaluation of the route. The border router then applies simple policy logic to that metadata and installs, withdraws, promotes, demotes, or otherwise changes the behavior of the route in the network.

Embodiments allow network device 302 (for example a policy server) to be deployed in an operator's network with a minimum of disruption. Any features from any of the embodiments can be combined and/or substituted with any from features from any other embodiments.

Embodiments comprise configuring network device 302 to operate as a route reflector entity in the network; in such embodiments, the at least one border network device 304 is configured to operate as a route reflector client in the network. As a result of the configuration of devices 302 and 304, the route data is received at network device 302 from the at least one border network device 304 and the modified route data is transmitted from the network device 302 to the at least one border network device 304 via a route reflector and route reflector client route data propagation mechanism.

A route reflector comprises a network device which performs special processing with respect to certain internal BGP sessions that are configured as route reflector clients. If a route reflector receives a route from one of the route reflector clients then it sends ("reflects") the route to the other route reflector clients. This avoids the need to configure a full mesh of BGP sessions between the clients, and consequently improves the scalability of BGP.

Network device 302 transmits, to at least one further border network device 306 which is configured to operate as a route reflector client in the network, the at least part of the modified route data; in such embodiments, the at least part of the modified route data is operable to instruct the at least one further border network device 306 to modify the behavior of at least one of its configured routes.

In embodiments, the at least part of the modified route data does not comprise data indicating that the route data was previously received from the at least one border network device. In such embodiments, when network device is processing the route data received from border network device 304, it does not add data indicating that the route data was previously received from the at least one border network device 304. In some such embodiments, the data field that indicates where the route data was received from, such as an ORIGINATOR_ID attribute, can be left blank by network device 302 or filled in with dummy data that does not identify the at least one border network device 304. The ORIGINATOR_ID attribute is a BGP attribute that identifies which BGP router originated the route into the local autonomous system.

In embodiments, the route data received from the at least one border network device 304 comprises route data for one or more preferred routes and route data for one or more less preferred routes. The one or more preferred routes may for example comprise routes from the LOC-RIB of the at least one border network device 304. The LOC-RIB of a BGP router comprises the set of BGP routes that the BGP router has decided are the best from among available routes. The one or more less preferred routes may for example comprise routes from the Adj-RIBs-In of the at least one border network device 304. The Adj-RIB-In of a BGP router comprises the set of BGP routes that the BGP router has received from a particular peer BGP router.

In embodiments, the route data received from the at least one border network device 304 comprises route data for all of the routes configured on the at least one border network device 304.

In embodiments, the route data is received from the at least one border network device 304 and the modified route data is transmitted from network device 302 using a mechanism which enables advertisement of multiple routes to the same destination prefix. The mechanism which enables advertisement of multiple routes to the same destination prefix may for example comprise one or more of the add-path extension to the Border Gateway Protocol (BGP), and one or more internal Border Gateway Protocol (BGP) sessions.

Some embodiments make use of BGP add-path which is an extension to BGP that allows a router to advertise multiple routes to the same destination prefix, not just the most preferred route. BGP add-path has been widely implemented and deployed. A router that uses BGP add-paths will advertise both the best route, as installed in its LOC-RIB, and some or all of the less preferred routes from its Adj-RIBs-In. BGP add-path is defined in the Internet draft draft-ietf-idr-add-paths-09.

In some embodiments which make use of BGP add-path, network device 302 is configured as a route reflector and border network devices such as 304 and 306 are configured as route reflector clients. Each border network device uses BGP add-path to advertise all of its routes to network device 302. Network device 302 evaluates each route it receives and generates metadata for each route. Using add-path, network device 302 advertises all of the routes for each destination prefix to each of the route reflector clients (304, 306 and possibly others (not shown)), including the client that originated each route, with an extended community string containing the metadata for each route. This is non-standard route-reflector behavior, as a BGP route is not usually advertised back to the router that originated it. Network device 302 does not add the ORIGINATOR_ID attribute to the route that it advertises back to the originating border router (this is also non-standard route reflector behavior).

Embodiments comprise configuring network device 302 to operate as a monitoring entity in the network; in such embodiments, the at least one border network device 304 is configured to recognize network device 302 as a route data monitoring entity. As a result of the configuration of devices 302 and 304, the route data is received at network device 302 from the at least one border network device 304 and the modified route data is transmitted from network device 302 to the at least one border network device 304 via a route data monitoring protocol.

Embodiments comprise, at network device 302, transmitting, to at least one further border network device 306 which is configured to recognize the network device as a route data monitoring entity, the at least part of the modified route data; in such embodiments, the at least part of the modified route data is operable to instruct the at least one further border network device 306 to modify the behavior of at least one of its configured routes.

In embodiments, the at least part of the modified route data does not comprise data identifying an autonomous system in which network device 302 is located. In embodiments, network device 302 does not add the local AS number to the route's AS path.

In embodiments, the processing does not comprise network device 302 altering the next hop address of the at least one route. In embodiments, network device 302 does not change the route's next hop address; this behavior may be configured as default behavior for network device 302 (other embodiments allow the operator to override this behavior).

In embodiments, network device 302 calculates on a given AS's policy from the inside of that AS, and therefore does not change the AS (for example, a first router in the AS would receive the route, pass it on to network device 302 which would perform the route data processing and send the resulting modified route data back to the original router and/or other routers in the AS). However, in other embodiments, if network device 302 is the "peering router" with the external entity, then network device 302 would add the local AS to the route.

Some embodiments make use of BGP Monitoring Protocol (BMP) which is a protocol that allows a BGP router to send the contents of its BGP Adj-RIBs-In to a monitoring station. In some embodiments, the communication is in the form of one or more BGP Update messages that describe the routes in an Adj-RIB-In, together with a BMP header which identifies the Adj-RIB-In. BMP is defined in the Internet draft draft-ietf-grow-bmp-07.

In some embodiments which make use of BMP, each border network device (for example 304, 306) uses BMP to send all of its routes to network device 302. Network device 302 evaluates each route it receives and generates metadata for each route. Using BGP add-path and internal BGP sessions, network device 302 advertises all of the routes for each prefix to all the border network devices in the AS. In some embodiments, network device 302 is configured as a route reflector for AS 306. In other embodiments, a separate device to network device 302 acts as a route reflector for AS 306. In still other embodiments, there is a full mesh of internal BGP sessions in AS 306.

A Public Key Infrastructure (PKI) is an infrastructure that allows for the distribution of public keys (used by public/private key cryptography) within a network. A PKI uses public/private key cryptography which is a form of cryptography that uses pairs of cryptographic keys to encrypt and decrypt private data. Each participant has a public key and a private key. The public key is shared to anyone who wishes to send data (using a public key infrastructure) while the private key is kept secret. Data is encrypted using the public key but can only be decrypted using the private key.

Some embodiments make use of Resource Public Key Infrastructure (RPKI) which is a security protocol which originated from the IETF's Secure Inter-Domain Routing (SIDR) working group. RPKI is a means for a border router to determine whether an external peer is entitled to advertise a given prefix, or not. The route's originator signs the prefix; the PKI is used to distribute public keys to enable signature checking. RPKI runs between the border router and an RPKI server. The RPKI server checks the signatures on the received routes and replies with a BGP community value which represents an outcome of TRUSTED, NOT-_TRUSTED or UNKNOWN.

Embodiments comprise configuring network device 302 to operate as a Resource Public Key Infrastructure (RPKI) server; in such embodiments, the at least one border network device 304 is configured to operate as a RPKI client in the network. As a result of the configuration of devices 302 and 304, the route data is received at network device 302 from the at least one border network device 304 and the modified route data is transmitted from network device 302 to the at least one border network device 304 via a RPKI query and response mechanism.

Embodiments comprise, at network device 302, transmitting, to at least one further border network device 306 which is configured to operate as a RPKI client in the network, the at least part of the modified route data. The at least part of the modified route data is operable to instruct the at least one further border network device 306 to modify the behavior of at least one of its configured routes.

In some embodiments which make use of RPKI, network device 302 masquerades as an RPKI server. Each border network device (such as border network devices 304 and 306) uses RPKI to send all of its routes to network device 302 for evaluation. Network device 302 evaluates each route and returns the metadata within the RPKI community. (This is non-standard RPKI behavior, as the RPKI standard only defines three allowed values for this community.)

Embodiments implement a policy server for which there is no comparable product in the market-place. It would be difficult to implement a policy server in an already overburdened hardware router due to central processing unit (CPU) and memory requirements. Deploying a policy server according to embodiments would result in the load and configuration on the border routers decreasing by many orders of magnitude, making them more stable and manageable. Deploying a policy server according to embodiments would also allow an operator to move very complex policy constructs out of a very limited, constrained command line interface (CLI) environment and move them to a set of high-level programming environments. By deploying a policy server according to embodiments, the use of standard software tooling (for example, scripting, sub-routines and modularity) becomes possible, as compared to the state of the industry today, where those concepts are not available in router configuration languages.

Certain methods as described above may be implemented in a hardware controller of a network device and/or a processing environment of a computer system.

Figure 5:
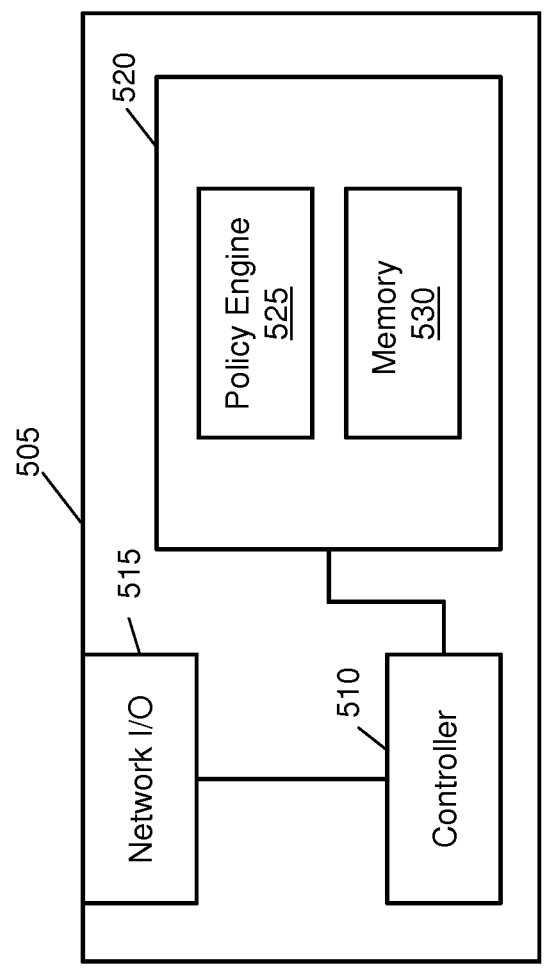
FIG. 5 shows a network device according to embodiments.

FIG. 5 shows a network device 505 according to embodiments. Network device may for example comprise any one of network device 302, border network device 304 and border network device 306 described above. As with the other Figures, this illustration is a schematic and certain features have been omitted for clarity of explanation. Network device 505 comprises a controller 510, a network interface 515 and computer-readable medium 520. The controller 510 may comprise one or more microprocessors (or a processing system), a system-on-chip or a programmable logic controller. The computer-readable medium 520 may comprise a (non-transitory) storage device/memory 530 accessible to the controller 510 such as a non-volatile memory (such as random access memory (RAM) and/or a solid state or magnetic storage device).

In some embodiments, the computer-readable medium 520 stores program code arranged to implement a policy engine 525 and data such as a set of policies, route data, etc. In certain examples, these objects need not be stored in a common computer-readable medium, for example they may be stored in different and/or separate storage mediums accessible to the controller 510. The program code of the policy engine 525 is executable by the controller 510 to cause the network device to perform at least one of the embodiments described above. The network device 505, in use, may perform various functions by sending and/or receiving network traffic via the network interface 515, which may comprise one or more physical network ports. The network device 505 may perform various functions by implementing the policy engine 525 according to a specification/configuration stored in memory 530.

One or more of the aspects of the embodiments described herein with reference to the drawings comprise processes performed by one or more network devices, entities or nodes. In embodiments, the one or more network devices comprise one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device; etc. Memory, as referred to above may comprise any suitable storage medium, including solid-state drives (SSD) or other semiconductor-based RAM; a ROM, for example a CD ROM or a semiconductor ROM; or a magnetic recording medium, for example a floppy disk or hard disk.

The above embodiments are to be understood as illustrative examples of the present disclosure. Further embodiments of the present disclosure are envisaged.

Embodiments are described above in relation to environments where BGP is employed, but embodiments may equally be applied in other environments such as where one or more of OSPF, RSVP, IS-IS, LDP, and other routing and path oriented protocols are employed instead of or in addition to BGP.

Embodiments described above include a single, centralized network device 302 to which route data is transmitted by one or more border network devices. In alternative embodiments, one or more of the functions of network device 302 are spread across a cluster of multiple network devices.

The network device 302 of embodiments provides a platform within the network for the implementation of a wide range of BGP policy types such as cryptographic authentication of BGP routes, spam filtering of BGP routes using statistical and historical analysis, dynamic re-prioritization of routes to match fluctuating business conditions, automatic aggregation and disaggregation of routes to control network load and to perform fine-grained traffic steering, and many other types of policy.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of embodiments of the present disclosure, which is defined in the accompanying claims.

What is claimed is:

1. A method for use in processing route data in a network comprising a plurality of autonomous systems, the method comprising:

at a network route data modification server, receiving, from at least one border network device in the network, route data defining at least one route for network traffic which is configured on the at least one border network device from which the route data was received, wherein the at least one border network device from which the route data was received is located at a border of an autonomous system in the plurality of autonomous systems;

at the network route data modification server, processing the route data received from the at least one border network device according to a set of policies to generate modified route data, wherein generating the modified route data comprises inserting metadata that defines one or more modifications to the at least one route into the received route data and inhibiting adding data indicating that the route data was previously received from the at least one border network device, wherein either (i) the modified route data includes a data field data that indicates where the route data was received from and the data field is left blank or is filled in with dummy data that does not identify the at least one border network device from which the route data was received or (ii) the modified route data does not include a data field that indicates where the route data was received from; and at the network route data modification server, transmitting, to the at least one border network device from which the route data was received, the generated modified route data, wherein the metadata in the generated modified route data is operable to instruct the at least one border network device from which the route data was received to modify the behavior of the at least one route on the at least one border network device from which the route data was received by one or more of installing, withdrawing, promoting and demoting the at least one route.

2. The method of claim 1, comprising, at the network route data modification server, transmitting, to at least one other border network device, the modified route data, wherein the modified route data is operable to instruct the at least one other border network device to modify the behavior of at least one route.

3. The method of claim 1, wherein the set of policies comprises at least one of:
one or more network operator-defined static policies, and
one or more dynamic policies based at least in part on one or more of historical route data and externally sourced route data.

4. The method of claim 3, comprising, at the network route data modification server, obtaining at least a part of the one or more historical route data and externally sourced route data from an Internet Route Registry (IRR) database located in the network.

5. The method of claim 1, comprising configuring the network route data modification server to operate as a route reflector entity in the network, wherein the at least one border network device from which the route data was received is configured to operate as a route reflector client in the network, whereby the route data is received at the network route data modification server from the at least one border network device and the modified route data is transmitted from the network route data modification server to the at least one border network device from which the route data was received via a route reflector and route reflector client route data propagation mechanism.

6. The method of claim 5, comprising, at the network route data modification server, transmitting, to at least one further border network device which is configured to operate as a route reflector client in the network, the modified route data, wherein the modified route data is operable to instruct the at least one further border network device to modify the behavior of at least one of its configured routes.

7. The method of claim 1, wherein the route data received from the at least one border network device comprises route data for one or more preferred routes and route data for one or more less preferred routes.

8. The method of claim 1, wherein the route data received from the at least one border network device comprises route data for all of the routes configured on the at least one border network device from which the route data was received.

9. The method of claim 1, wherein the route data is received from the at least one border network device and the modified route data is transmitted from the network route data modification server using a mechanism which enables advertisement of multiple routes to the same destination prefix.

10. The method of claim 9, wherein the mechanism which enables advertisement of multiple routes to the same destination prefix comprises one or more of:
the add-path extension to the Border Gateway Protocol (BGP), and
one or more internal Border Gateway Protocol (BGP) sessions.

11. The method of claim 1, comprising configuring the network route data modification server to operate as a monitoring entity in the network, wherein the at least one border network device from which the route data was received is configured to recognize the network route data modification server as a route data monitoring entity, whereby the route data is received at the network route data modification server from the at least one border network device and the modified route data is transmitted from the network route modification server to the at least one border network device from which the route data was received via a route data monitoring protocol.

12. The method of claim 11, comprising, at the network route data modification server, transmitting, to at least one further border network device which is configured to recognize the network route data modification server as a route data monitoring entity, the modified route data, wherein the modified route data is operable to instruct the at least one further border network device to modify the behavior of at least one of its configured routes.

13. The method of claim 1, wherein the modified route data does not comprise data identifying an autonomous system in which the network route data modification server is located.

14. The method of claim 1, wherein the processing does not comprise altering the next hop address of the at least one route.

15. The method of claim 1, comprising configuring the network route data modification server to operate as a Resource Public Key Infrastructure (RPKI) server, wherein the at least one border network device from which the route data was received is configured to operate as a RPKI client in the network, whereby the route data is received at the network route data modification server from the at least one border network device and the modified route data is transmitted from the network route data modification server to the at least one border network device from which the route data was received via a RPKI query and response mechanism.

16. The method of claim 15, comprising, at the network route data modification server, transmitting, to at least one further border network device which is configured to operate as a RPKI client in the network, the modified route data, wherein the modified route data is operable to instruct the at least one further border network device to modify the behavior of at least one of its configured routes.

17. A system for use in processing route data in a network comprising a plurality of autonomous systems, the system comprising at least one memory including computer program code; and at least one processor in data communication with the at least one memory, wherein the at least one processor is configured to:
at a network route data modification server, receive, from at least one border network device in the network, route data defining at least one route for network traffic which is configured on the at least one border network device from which the route data was received, wherein the at least one border network device from which the route data was received is located at a border of an autonomous system in the plurality of autonomous systems;
at the network route data modification server, process the route data received from the at least one border network device according to a set of policies to generate modified route data for the at least one route, wherein generating the modified route data comprises inserting metadata that defines one or more modifications to the at least one route into the received route data and inhibiting adding data indicating that the route data was previously received from the at least one border network device, wherein either (i) the modified route data includes a data field data that indicates where the route data was received from and the data field is left blank or is filled in with dummy data that does not identify the at least one border network device from which the route data was received or (ii) the modified route data does not include a data field that indicates where the route data was received from; and
at the network route data modification server, transmit, to the at least one border network device from which the route data was received, the generated modified route data, wherein the metadata in the generated modified route data is operable to instruct the at least one border network device from which the route data was received to modify the behavior of the at least one route on the at least one border network device from which the route data was received by one or more of installing, withdrawing, promoting and demoting the at least one route.

18. A non-transitory computer-readable storage medium comprising computer-executable instructions which, when executed by a processor, cause a computing device to perform a method for use in processing route data in a network comprising a plurality of autonomous systems, the method comprising:
at a network route data modification server, receiving, from at least one border network device in the network, route data defining at least one route for network traffic which is configured on the at least one border network device from which the route data was received, wherein the at least one border network device from which the route data was received is located at a border of an autonomous system in the plurality of autonomous systems;
at the network route data modification server, processing the route data received from the at least one border network device according to a set of policies to generate modified route data, wherein generating the modified route data comprises inserting metadata that defines one or more modifications to the at least one route into the received route data and inhibiting adding data indicating that the route data was previously received from the at least one border network device, wherein either (i) the modified route data includes a data field data that indicates where the route data was received from and the data field is left blank or is filled in with dummy data that does not identify the at least one border network device from which the route data was received or (ii) the modified route data does not include a data field that indicates where the route data was received from; and
at the network route data modification server, transmitting, to the at least one border network device from which the route data was received, the generated modified route data, wherein the metadata in the generated modified route data is operable to instruct the at least one border network device from which the route data was received to modify the behavior of the at least one route on the at least one border network device from which the route data was received by one or more of installing, withdrawing, promoting and demoting the at least one route.

19. A method for use in processing route data in a network comprising a plurality of autonomous systems, the method comprising:
   at a border network device in the network, transmitting, to a network route data modification server, route data defining at least one route for network traffic which is configured on the border network device, wherein the border network device is located at a border of an autonomous system in the plurality of autonomous systems;
   at the border network device, receiving, from the network route data modification server, modified route data, the modified route data having been generated at the network route data modification server by processing the route data transmitted from the border network device according to a set of policies, wherein generating the modified route data comprises inserting metadata that defines one or more modifications to the at least one route into the received route data and inhibiting adding data indicating that the route data was previously received from the at least one border network device, wherein either (i) the modified route data includes a data field data that indicates where the route data was received from and the data field is left blank or is filled in with dummy data that does not identify the at least one border network device from which the route data was received or (ii) the modified route data does not include a data field that indicates where the route data was received from; and
   at the border network device, in response to receipt of the generated modified route data, modifying the behavior of the at least one route on the at least one border network device by one or more of installing, withdrawing, promoting and demoting the at least one route.

* * * * *